July 11, 1961

C. J. KINSEY 2,991,649

ENGINE TEST STAND

Filed March 14, 1958

INVENTOR.
Claude J. Kinsey
BY
L. D. Burch
ATTORNEY

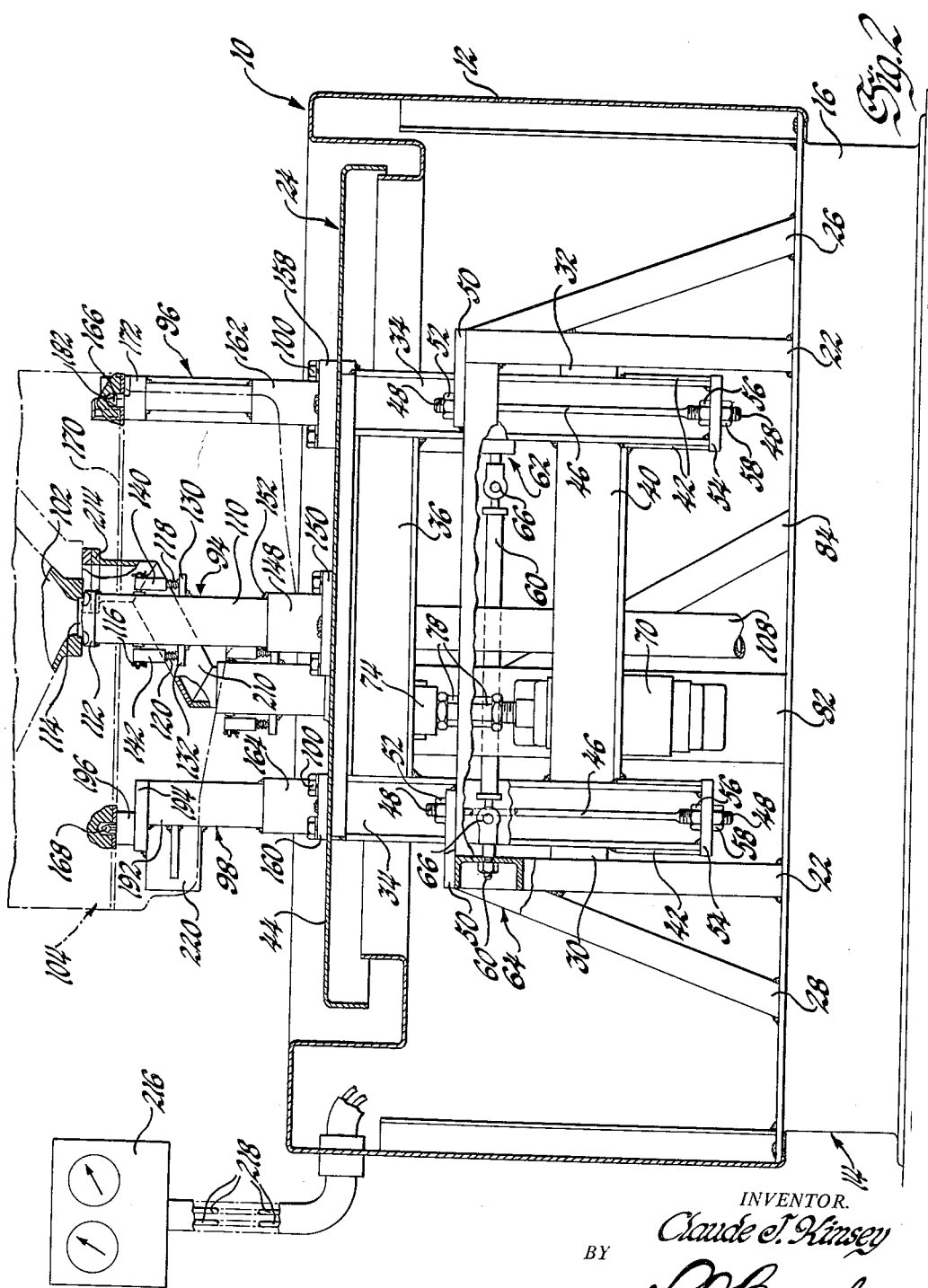

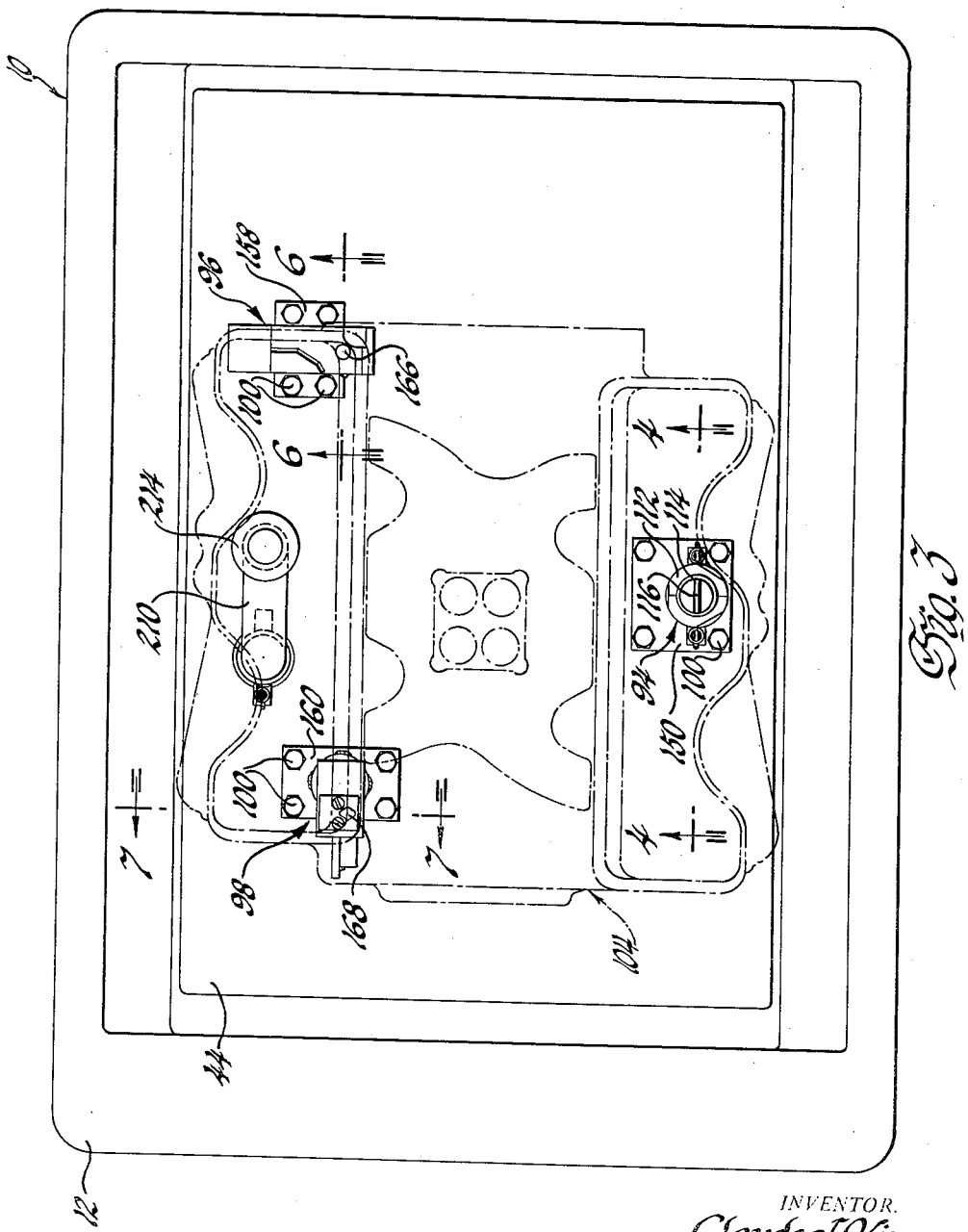

July 11, 1961
C. J. KINSEY
2,991,649
ENGINE TEST STAND
Filed March 14, 1958
4 Sheets-Sheet 4
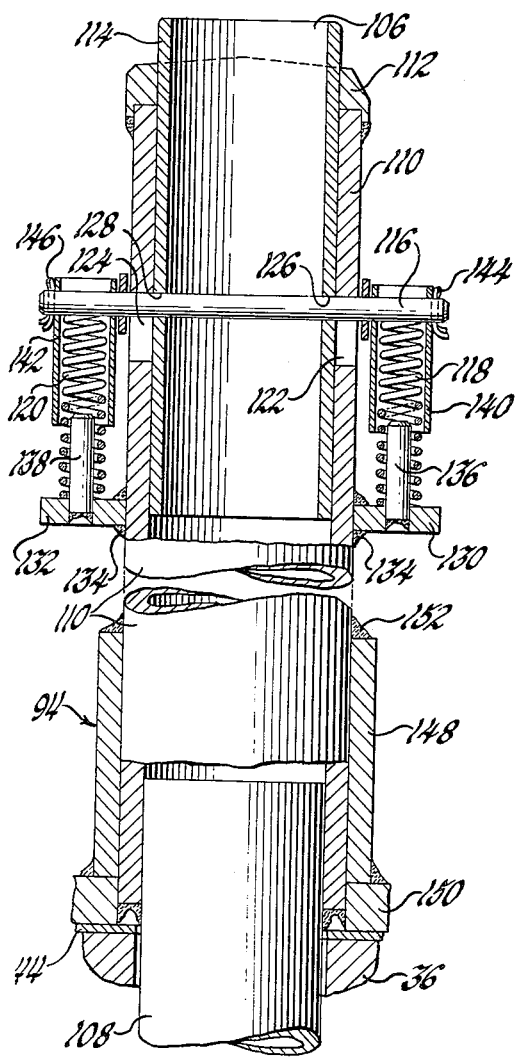
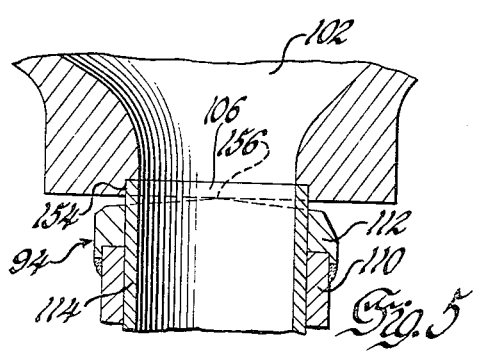
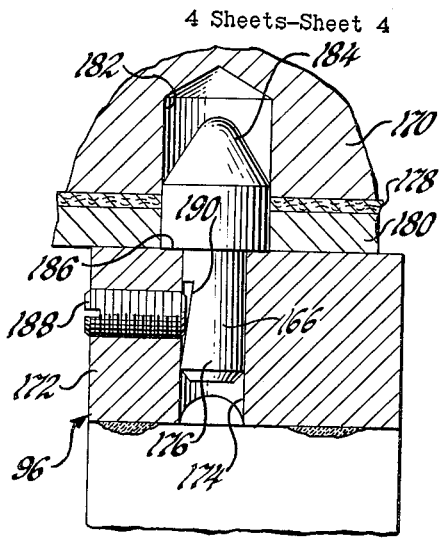
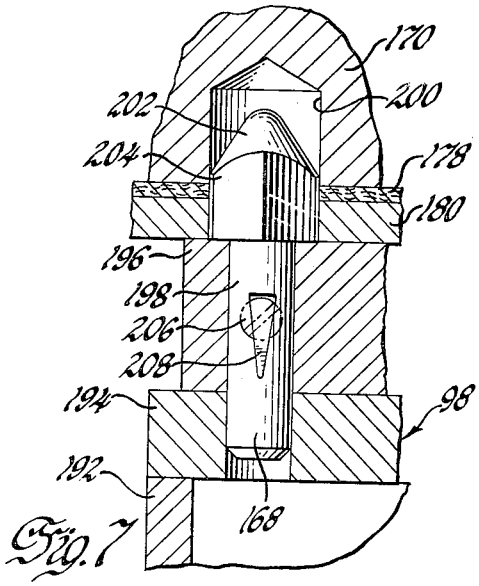
INVENTOR.
Claude J. Kinsey
BY
L.D. Burch
ATTORNEY

United States Patent Office 2,991,649
Patented July 11, 1961

2,991,649
ENGINE TEST STAND
Claude J. Kinsey, Detroit, Mich., assignor to General Motors Corporation, Detroit, Mich., a corporation of Delaware
Filed Mar. 14, 1958, Ser. No. 721,538
4 Claims. (Cl. 73—116)

This invention relates to engine test stands and more particularly to a mounting system for engine test stands.

In assembly line production of motor vehicle engines it is necessary somewhere along the production line to balance the engine and remove objectionable vibrations that may lessen the life of the engine or effect the operation of the engine. This has been accomplished in the past by carefully balancing the individual rotating parts, followed by a general balance check on the assembled engine. Many of the machines for balancing the assembled engines have had provisions for driving the engine by an outside source, thereby increasing the balance problems, since power connections and the like have to be considered in the overall engine balance. In addition, such machines take up a considerable amount of space in the production plant and the balancing operation requires a separate station on the assembly line. A further limitation of this type of machine is the necessity of running the engine at a precise speed, or within very narrow limits, to correctly evaluate engine vibrations and to properly correct such vibrations.

Recent developments in engine balancing have indicated the possibility of balancing the engine while running under its own power at a later station along the assembly line and in such installations the engine is suspended by chains or clamping fixtures hanging from overhead rails. This type operation still requires a separate station along the assembly line and also requires that the engine be run at a very precise speed, or within narrow limits, to properly determine the balance condition of the engine. These operations generally do not correct for unbalance conditions but require the engine to be transported to another station for correction and returned to the balance station for further determination. It is obvious, therefore, that such balancing operations require a large amount of production plant floor space and a great amount of time and labor which increases the cost of the final engine.

The device in which this invention is embodied consists of a test stand located at the "run in" station of the assembly line. The engine is mounted on three posts secured to a movable cradle in the test stand and allows for the accomplishment of two operations at one time. The engine is run under its own power to check the operation of the assembled component parts and at the same time the balance condition is determined and necessary corrections made. The mounting posts raise the engine above the level of the test stand to allow visual inspection of the entire engine with a minimum of obstructions. The three point mounting further increases the ease and accuracy of the balancing operation and gives maximum stability to the engine mounted on the test stand. It is not necessary to transport the engine from station to station in correcting for balance, and the uncertainty of increasing the balance error with chains and clamps is eliminated in the balance operation. Thus, a full assembly line operation is eliminated, greater ease and accuracy in balancing are obtained, a large and costly production machine is eliminated, and greater stability is given the engine on the test stand. These improvements allow a more efficient and economical operation, decreasing the time and labor generally required and use a less operator effort.

In the drawings:

FIGURE 2 is a side view of the test stand of FIGURE 1, with parts broken away and in section, showing the structure of the test stand and the movable cradle.

FIGURE 3 is a plan view of the test stand of FIGURE 1 showing the position of the mounting posts and the location of an engine mounted thereon.

FIGURE 4 is an enlarged sectional view of one of the mounting posts of the test stand taken along the line 4—4 of FIGURE 3.

FIGURE 5 is a partial sectional view of the mounting post of FIGURE 4 showing the connection thereof in the exhaust manifold of the engine.

FIGURE 6 is an enlarged sectional view of one of the mounting pins for the test stand taken along the line 6—6 of FIGURE 3.

FIGURE 7 is an enlarged sectional view of another mounting pin taken along the line 7—7 of FIGURE 3.

Figure 1:
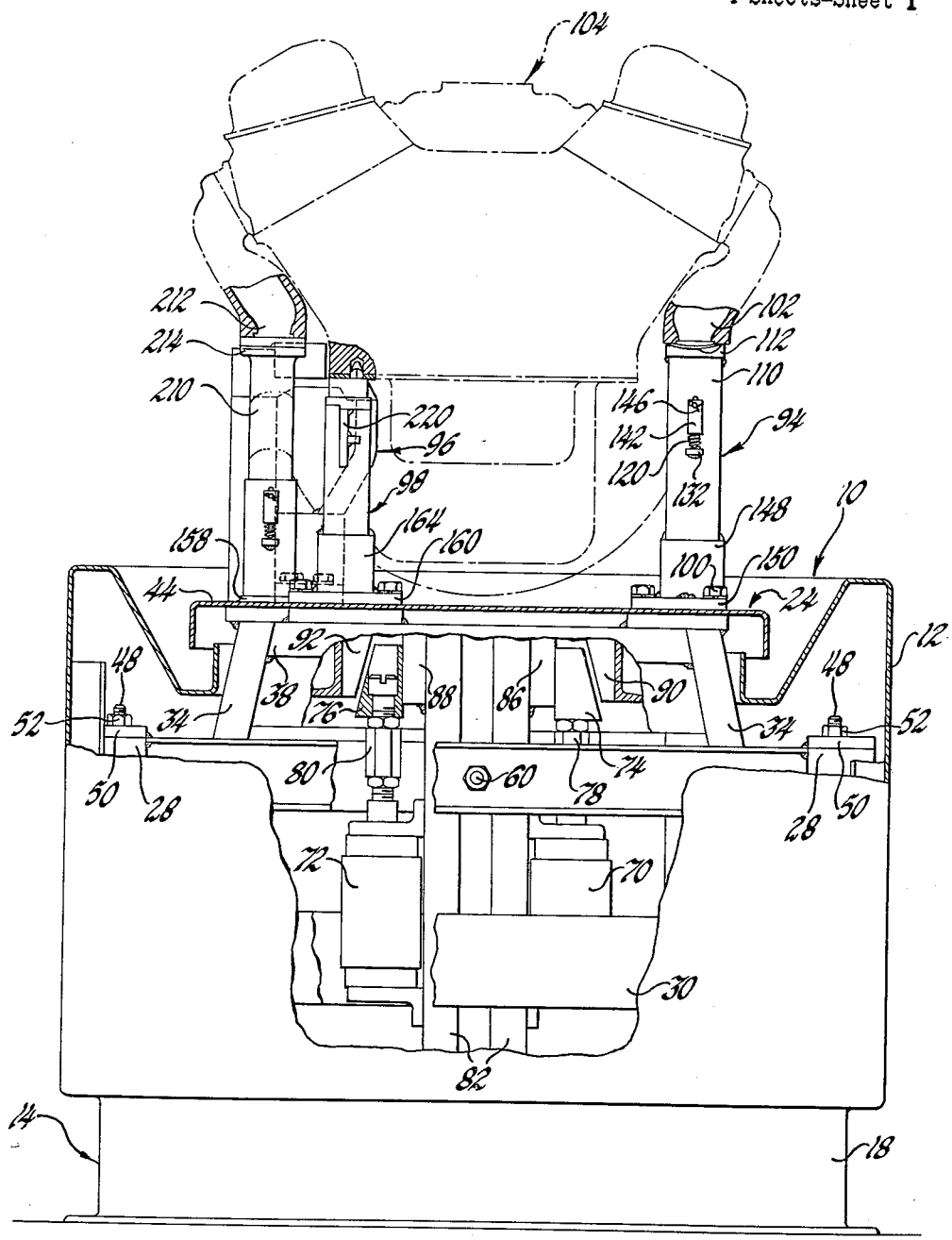
FIGURE 1 is an elevation view, partly in section, showing the test stand and the mounting posts and the position of an engine mounted thereon.

Referring more particularly to the drawings, FIGURES 1 and 2 show the engine test stand, indicated generally by the numeral 10, having an outside sheet metal cabinet 12 and a supporting frame 14. The cabinet frame 14 has longitudinal members 16 and lateral members 18 forming a base for the test stand. Vertical beams 22, on either side of the test stand, are welded to the base members 16 to support the movable cradle, indicated generally by the numeral 24, and diagonal beams 26 and 28, welded to the vertical beams 22 and to the base members 16, provide further support. Cross beams 30 and 32 welded to the vertical beams 22 add rigidity and stability to the frame.

The floating cradle 24 and the supporting structure therefor are located within the sheet metal cabinet 12. Four corner beams 34 extend downwardly and outwardly from the top of the cradle and are secured by the longitudinal members 36 and lateral members 38. Further support is provided by the longitudinal beams 40, intermediate the ends of the corner beams 34, and lateral beams 42, at the lower ends of the corner beams. A stainless steel plate 44 forms the top of the cradle to provide an immediate visual indication of oil and fuel leaks in an engine being tested.

The cradle structure is supported in the cabinet frame by suspension bars 46 connecting the bottom of each cradle corner post 34 and the cabinet frame. The suspension bars are elongated rod members having threaded portions 48 at either end and allow free floating movement of the cradle. The bars are secured to brackets 50, welded to the top of the vertical cabinet frame beams 22, by the nuts 52 and extend to the plates 54 welded to the lower ends of the cradle corner beams 34. Nuts 56 and 58 secure the lower ends of the suspension bars to the plates 54. The sway bar 60, attached at one end 62 to the cradle supporting structure intermediate the corner posts 34 and attached at the other end 64 to the cabinet frame intermediate the vertical beams, limits movement of the cradle in the longitudinal direction. Universal joints 66 and suspension bars 46 allow free floating movement of the cradle in the lateral direction.

When an engine is to be mounted on the test stand, it is necessary to lock the cradle for ease in properly locating the engine. Locking is accomplished by means of the air cylinders 70 and 72 and wedges 74 and 76, secured to the piston rods of the air cylinders as by linkages 78 and 80. The air cylinders are secured to the beam 82 which in turn is welded at its lower end to the cabinet frame. Diagonal braces 84 lend rigidity to the beam 82. The wedges 74 and 76 act between the blocks 86 and 88, welded to the beam 82, and the blocks 90 and 92, secured to the cradle structure. Thus when the cradle is to be locked, the air cylinders are actuated to move the wedges into engagement with the blocks and prevent movement of the cradle. The wedges are withdrawn by the air cylinders when free movement of the cradle is desired.

Mounted on the upper side of the cradle plate are three mounting posts 94, 96, and 98. The posts are securely bolted to the cradle plate and supporting structure by bolts 100. The mounting post 94, shown in more detail in FIGURE 4, is received in the exhaust manifold 102 of the engine 104 mounted on the test stand and has passage 106 formed therethrough to connect with the general exhaust line 108. The mounting post consists of an outer sleeve 110 which has a crown member 112 welded to the top thereof. An inner sleeve 14 fits within the outer sleeve and is movable with respect thereto through the bar 116 and the springs 118 and 120. A pair of slots 122 and 124 in the outer sleeve 110 allow vertical movement of the bar 116, and holes 126 and 128 in the inner sleeve and through which the bar 116 passes, provide for movement of the inner sleeve with the bar 116 against the springs 118 and 120. A pair of brackets 130 and 132, welded to the outer sleeve as at 134, retain the lower ends of the springs 118 and 120 and secure the locating pins 136 and 138. The sleeves 140 and 142 surrounding the springs allow for vertical movement of the springs. Cotter pins 144 and 146 secure the bar at either end to prevent lateral movement thereof and disconnection of the spring assemblies. As seen in FIGURE 4, a third sleeve member 148 welded to the base plate 150 and to the outer sleeve 110 at 152 securely retains the mounting post in the proper position. The general exhaust line 108 extends upwardly into the outer sleeve, through the cradle plate 44 and the supporting member 36. The operation of the exhaust mounting post is illustrated in FIGURE 5, the exhaust manifold of the engine 102 resting on the crown portion 112 surrounding the inner sleeve 114. The inner sleeve extends a short distance into the exhaust manifold, fitting into an annular groove 154 in the exhaust manifold. Thus the exhaust manifold is supported on two points, as the point 156, one on either side of the crown member 112, allowing for free vibration of the engine on the post 94.

Referring again to FIGURE 2, the remaining two mounting posts 96 and 98 are securely attached to the cradle by the plates 158 and 160 secured by the bolts 100. Sleeves 162 and 164 welded to the plates 158 and 160, retain the posts 94 and 96 in a stable vertical position. At the upper ends of the mounting posts are the pins 166 and 168 which are receivable in holes provided in the pan rail 170 of the engine.

FIGURES 6 and 7 show the mounting pins more clearly. The mounting post 96 has a cap portion 172 welded thereon, the cap portion having a vertical hole 174 therethrough to receive the shank 176 of the locating pin 166. The pan rail 170, the oil seal gasket 178 and the oil pan flange 180 are provided with a hole 182 to receive the locating pin 166. The conical portion 184 of the pin provides correct alignment when the engine is mounted thereon and the shoulder portion 186 secures the engine in position. A lock screw 188 seats in the flat 190 provided in the shank 176 to prevent rotation and vertical movement of the locking pin.

The mounting post 98 is similar in nature to mounting post 96, FIGURE 7 showing the post 192 having the plate 194 and the cap portion 196 retaining the shank 198 of the locating pin 168. The pan rail 170, gasket 178, and oil pan flange 180 are similarly provided with a locating pin hole 200. The conical portion 202 of the locating pin centers in the hole 200 and the rectangular portion of the pin 204 prevents movement of the engine when located. Locking screw 206 seats in the flat 208 to prevent rotation and vertical movement of the locking pin.

Also mounted on the cradle plate and supporting structure is an exhaust pipe 210 attached to the exhaust manifold 212 on the opposite bank of cylinders of the engine 104 and communicating with the general exhaust line 108. The structure of the exhaust pipe is similar in nature to the mounting post 94 as shown in FIGURE 4, except that the upper flange 214 is not crowned but is received flush against the exhaust manifold. A similar bar and spring assembly is provided; however, a greater degree of movement of the exhaust pipe is allowed so that the exhaust pipe will be free floating and will not act as a support for the engine.

Located adjacent the engine test stand is a suitable indicating means for recording engine vibration, such as is shown schematically in FIGURE 2. Indicating means 216 is connected to the test stand by cables 218 the electrical system being described in Serial No. 646,319, entitled "Unbalance Indicator" and assigned to the assignee of this invention. To pick up engine vibrations, any pickup devices known in the art may be used and attached at suitable places on the engine and on the test stand. For example, a pickup bracket 220 may be provided on the mounting post 98. Also located near the test stand but not shown are suitable oil, water, fuel, and electrical connections to be directly attached to the engine mounted on the test stand to allow the engine to run under its own power.

The operaion of the engine test is as follows: An engine is suitably transported to the test stand from the previous assembly operation. The cylinders 70 and 72 of the test stand are actuated to move the wedges 74 and 76 and locking the cradle in a stationary position. The engine is mounted on the three mounting posts 94, 96, and 98 with the pins 166 and 168, of mounting posts 96 and 98 respectively, locating in the pan rail 170 of the engine. The mounting post 94 is situated directly under the exhaust manifold of the engine on the opposite side from the other mounting posts and the inner sleeve 114 is received in the exhaust manifold. The cylinders are again actuated to remove the wedges and the cradle and engine are free to vibrate. Suitable connections are made to the engine so that it may be started and operated under its own power and any vibration or unbalance is recorded on the indicating means. After tests are completed, the engine may be removed by again wedging the cradle and lifting the engine off the mounting posts.

Thus it may be seen that a greatly improved method of testing the balance condition of an engine is obtained and the unbalance indicated will be only of the engine and not of the test stand as well. The three point mounting provides a stable support for the engine and restricts the unbalance testing and determination to the engine.

The claims:
1. A production line engine test stand comprising a frame, a cradle secured to said frame and laterally movable with respect thereto, three mounting posts secured to said cradle and movable therewith, said posts adapted to receive an engine operable under its own power, one of said posts aligning with the exhaust manifold of said engine and having an opening therethrough for conveying exhaust gases away from said test stand, and means for recording the vibration of said engine when said engine is running and when mounted on said posts.

2. An engine test stand for use on a production line to determine the vibration characteristics of an engine mounted thereon and comprising a frame, a cradle secured to said frame and laterally movable therein, three mounting posts secured to said cradle for mounting an engine for balancing and test purposes and operable under its own power, locating pins secured in two of said posts and receivable in the pan rail of said engine and on one side thereof, and the other of said posts having a passage therethrough and receivable in the exhaust manifold on the other side of said engine for carrying away objectionable exhaust gases, and means for recording the vibration of said engine when said engine is operating and when mounted on said test stand.

3. An engine test stand for use on an assembly line to determine the balance condition of an engine and to visually inspect said engine for oil and fuel leakage and comprising a frame, a cradle secured to said frame and movable in one direction with respect thereto, three mounting posts secured to said cradle and movable therewith for mounting an engine, said direction of movement of said cradle being normal to the axis of the crank shaft in said engine, two of said mounting posts secured to said cradle at one side thereof and a third of said posts secured to said cradle on the other side thereof, said two mounting posts having mounting pins secured therein and receivable in one side of said engine, said third post receivable in the exhaust manifold of said engine and having a passage formed therethrough to carry away objectionable exhaust gases from said engine, all of said posts adapted to space said engine from said cradle to allow visual inspection of the underside of said engine.

4. A mounting system for mounting an engine on an assembly line test stand to determine the balance condition of said engine and visually inspecting said engine for fuel and oil leaks therein and comprising a movable cradle for mounting an engine operable under its own power, three mounting posts retaining said engine in vertical spaced relation to said cradle to allow access to the underside of said engine, two of said posts having pins secured therein and receivable in one side of said engine, the third of said mounting posts being receivable in the exhaust manifold of said engine and having a passage formed therethrough for conveying objectionable exhaust gases away from said test stand, and means for recording the vibration of said engine when said engine is operating and mounted on said test stand.

References Cited in the file of this patent

UNITED STATES PATENTS

| | | |
|---|---|---|
| 2,171,927 | Fuchs | Sept. 5, 1939 |
| 2,174,176 | Journeaux et al. | Sept. 26, 1939 |
| 2,741,830 | Lewis | Apr. 17, 1956 |
| 2,825,477 | Ross | Mar. 4, 1958 |
| 2,851,879 | Weatherbee et al. | Sept. 16, 1958 |
| 2,867,766 | Broder et al. | Jan. 6, 1959 |

FOREIGN PATENTS

| | | |
|---|---|---|
| 560,956 | Great Britain | Apr. 28, 1944 |